United States Patent
McCall et al.

(10) Patent No.: US 8,742,183 B2
(45) Date of Patent: Jun. 3, 2014

(54) PRODUCTION OF AVIATION FUEL FROM BIORENEWABLE FEEDSTOCKS

(75) Inventors: Michael J. McCall, Geneva, IL (US); Terry L. Marker, Palos Heights, IL (US); Richard E. Marinangeli, Arlington Heights, IL (US); Joseph A. Kocal, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 674 days.

(21) Appl. No.: 12/238,945

(22) Filed: Sep. 26, 2008

(65) Prior Publication Data

US 2009/0158637 A1   Jun. 25, 2009

Related U.S. Application Data

(60) Provisional application No. 61/015,749, filed on Dec. 21, 2007.

(51) Int. Cl.
*C07C 1/00* (2006.01)
*C07C 4/00* (2006.01)
*C10L 1/16* (2006.01)

(52) U.S. Cl.
USPC .............. 585/240; 585/241; 585/242; 44/308

(58) Field of Classification Search
USPC ............................. 44/308; 585/240, 241, 242
See application file for complete search history.

(56) References Cited

U.S. PATENT DOCUMENTS

| | | | |
|---|---|---|---|
| 3,308,052 A | 3/1967 | Ireland et al. | |
| 3,630,885 A | 12/1971 | Egan | |
| 4,992,605 A * | 2/1991 | Craig et al. | 585/240 |
| 5,186,722 A | 2/1993 | Cantrell et al. | |
| 5,705,722 A | 1/1998 | Monnier et al. | |
| 7,232,935 B2 | 6/2007 | Jakkula et al. | |
| 7,279,018 B2 | 10/2007 | Jakkula et al. | |
| 7,354,507 B2 * | 4/2008 | Gopalakrishnan et al. | 208/78 |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,540,952 B2 | 6/2009 | Pinho et al. | |

(Continued)

FOREIGN PATENT DOCUMENTS

| | | |
|---|---|---|
| CN | 11270300 A | 9/2008 |
| CN | 11343552 A | 1/2009 |

(Continued)

OTHER PUBLICATIONS

Huber, "Processing biomass in conventional oil refineries: Production of high quality diesel by hydrotreating vegetable oils in heavy vacuum oil mixtures", Applied Catalysis A: General, 2007, pp. 120-129, vol. 329.

*Primary Examiner* — Ellen McAvoy
*Assistant Examiner* — Latosha Hines
(74) *Attorney, Agent, or Firm* — Maryann Maas (57) ABSTRACT

A process has been developed for producing aviation fuel from renewable feedstocks such as plant oils and animal fats and oils. The process involves treating a renewable feedstock by hydrogenating and deoxygenating to provide n-paraffins having from about 8 to about 24 carbon atoms. At least some of the n-paraffins are isomerized to improve cold flow properties. At least a portion of the paraffins are selectively cracked to provide paraffins meeting specifications for different aviation fuels such as JP-8.

17 Claims, 2 Drawing Sheets

(56) References Cited

U.S. PATENT DOCUMENTS

| | | | |
|---|---|---|---|
| 7,816,570 B2 * | 10/2010 | Roberts et al. | 585/240 |
| 2005/0205462 A1 | 9/2005 | Gopalakrishnan et al. | |
| 2006/0186020 A1 | 8/2006 | Gomes | |
| 2006/0207166 A1 | 9/2006 | Herskowitz et al. | |
| 2006/0264684 A1 | 11/2006 | Petri et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |
| 2007/0161832 A1 | 7/2007 | Myllyoja et al. | |
| 2007/0170091 A1 | 7/2007 | Monnier et al. | |
| 2007/0175795 A1 | 8/2007 | Yao et al. | |
| 2007/0260102 A1 | 11/2007 | Duarte Santiago et al. | |
| 2007/0281875 A1 | 12/2007 | Scheibel et al. | |
| 2007/0287873 A1 | 12/2007 | Coupard et al. | |
| 2007/0299291 A1 | 12/2007 | Koivusalmi | |
| 2008/0025903 A1 | 1/2008 | Cortright | |
| 2008/0033188 A1 | 2/2008 | Dumesic et al. | |
| 2008/0045731 A1 | 2/2008 | Zhang | |
| 2008/0050792 A1 | 2/2008 | Zmierczak et al. | |
| 2008/0052983 A1 | 3/2008 | Aulich et al. | |
| 2008/0066374 A1 | 3/2008 | Herskowitz | |
| 2008/0092436 A1 | 4/2008 | Seames et al. | |
| 2008/0132435 A1 | 6/2008 | Ferreira Fontes et al. | |
| 2008/0156694 A1 | 7/2008 | Chapus et al. | |
| 2008/0161614 A1 | 7/2008 | Bertoncini et al. | |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0216391 A1 | 9/2008 | Cortright et al. | |
| 2008/0229654 A1 | 9/2008 | Bradin | |
| 2008/0244962 A1 | 10/2008 | Abhari et al. | |
| 2008/0281134 A1 | 11/2008 | Ghonasgi et al. | |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2008/0308457 A1 | 12/2008 | Dindi et al. | |
| 2008/0308458 A1 | 12/2008 | Dindi et al. | |
| 2008/0312480 A1 | 12/2008 | Dindi et al. | |
| 2008/0313955 A1 | 12/2008 | Silva et al. | |
| 2009/0014354 A1 | 1/2009 | Knuuttila et al. | |
| 2009/0019763 A1 | 1/2009 | Ghonasgi et al. | |
| 2009/0029427 A1 | 1/2009 | Miller | |
| 2009/0031617 A1 | 2/2009 | O'Rear | |
| 2009/0062578 A1 | 3/2009 | Koivusalmi et al. | |
| 2009/0069610 A1 | 3/2009 | Roberts, IV et al. | |
| 2009/0071872 A1 | 3/2009 | Ginosar et al. | |
| 2009/0077866 A1 | 3/2009 | Kalnes et al. | |
| 2009/0082606 A1 | 3/2009 | Marker et al. | |
| 2009/0084026 A1 | 4/2009 | Miller | |
| 2009/0088351 A1 | 4/2009 | Miller | |
| 2009/0107033 A1 | 4/2009 | Gudde et al. | |
| 2009/0124839 A1 | 5/2009 | Dumesic et al. | |
| 2009/0126260 A1 | 5/2009 | Aravanis et al. | |
| 2009/0162264 A1 | 6/2009 | McCall et al. | |

FOREIGN PATENT DOCUMENTS

| | | | |
|---|---|---|---|
| EP | 1396531 | * | 3/2004 |
| EP | 1396531 A2 | * | 3/2004 |
| EP | 1719811 A1 | | 8/2006 |
| EP | 2046917 | | 1/2008 |
| WO | 2007063874 A1 | | 6/2007 |
| WO | 2007064015 A1 | | 6/2007 |
| WO | 2007064019 A1 | | 6/2007 |
| WO | 2007068797 A | | 6/2007 |
| WO | WO 2007/064019 A1 | | 6/2007 |
| WO | WO 2007/063874 A1 | | 6/2007 |
| WO | WO 2007/064015 A1 | | 6/2007 |
| WO | 2007125332 A1 | | 11/2007 |
| WO | WO 2007/125332 A1 | | 11/2007 |
| WO | 2007141293 A1 | | 12/2007 |
| WO | WO 2007/141293 A1 | | 12/2007 |
| WO | 2008012415 A2 | | 1/2008 |
| WO | WO 2008/012415 A2 | | 1/2008 |
| WO | 2008020048 A2 | | 2/2008 |
| WO | WO 2008/020048 A2 | | 2/2008 |
| WO | 2008053284 A1 | | 5/2008 |
| WO | WO 2008/053284 A1 | | 5/2008 |
| WO | 2008101945 A1 | | 8/2008 |
| WO | WO 2008/101945 A1 | | 8/2008 |
| WO | 2008105518 A1 | | 9/2008 |
| WO | 2008119895 A2 | | 9/2008 |
| WO | WO 2008/105518 A1 | | 9/2008 |
| WO | WO 2008/119895 A2 | | 9/2008 |
| WO | 2008141830 A1 | | 11/2008 |
| WO | 2008141831 A1 | | 11/2008 |
| WO | WO 2008/141830 A1 | | 11/2008 |
| WO | WO 2008/141831 A1 | | 11/2008 |
| WO | 2008151792 A1 | | 12/2008 |
| WO | 2008152199 A1 | | 12/2008 |
| WO | WO 2008/151792 A1 | | 12/2008 |
| WO | WO 2008/152199 A1 | | 12/2008 |
| WO | 2009004181 A2 | | 1/2009 |
| WO | 2009011639 A2 | | 1/2009 |
| WO | 2009013233 A2 | | 1/2009 |
| WO | WO 2009/004181 A2 | | 1/2009 |
| WO | WO 2009/011639 A2 | | 1/2009 |
| WO | WO 2009/013233 A2 | | 1/2009 |
| WO | 2009020055 A1 | | 2/2009 |
| WO | 2009025542 A1 | | 2/2009 |
| WO | WO 2009/020055 A1 | | 2/2009 |
| WO | WO 2009/025542 A1 | | 2/2009 |
| WO | 2009059819 A1 | | 5/2009 |
| WO | 2009059920 A2 | | 5/2009 |
| WO | WO 2009/059819 A1 | | 5/2009 |
| WO | WO 2009/059920 A2 | | 5/2009 |
| WO | 2009085686 A1 | | 7/2009 |

* cited by examiner

PRODUCTION OF AVIATION FUEL FROM BIORENEWABLE FEEDSTOCKS

CROSS-REFERENCE TO RELATED APPLICATION

This application claims priority from Provisional Application Ser. No. 61/015,749 filed Dec. 21, 2007, the contents of which are hereby incorporated by reference in its entirety.

STATEMENT REGARDING FEDERALLY SPONSORED RESEARCH OR DEVELOPMENT

This invention was made under the support of the United States Government, United States Army Research Office, with financial support from DARPA, Agreement Number W911NF-07-C-0049. The United States Government has certain rights in the invention.

BACKGROUND OF THE INVENTION

This invention relates to a process for producing hydrocarbons useful as fuel, such as aviation fuel, from renewable feedstocks with the glycerides and free fatty acids found in materials such as plant oils, fish oils, animal fats, and greases. The process involves hydrogenation, decarboxylation, decarbonylation, and/or hydrodeoxygenation, hydroisomerization, and selective cracking in two or more steps. The selective cracking step optimally provides one cracking event per molecule. A reforming step may be optionally employed to generate hydrogen used in the hydrogenation, deoxygenation, hydroisomerization, and selective hydrocracking steps.

As the demand for fuel such as aviation fuel increases worldwide there is increasing interest in sources other than petroleum crude oil for producing the fuel. One such source is what has been termed renewable sources. These renewable sources include, but are not limited to, plant oils such as corn, rapeseed, canola, soybean and algal oils, animal fats such as tallow, fish oils and various waste streams such as yellow and brown greases and sewage sludge. The common feature of these sources is that they are composed of glycerides and Free Fatty Acids (FFA). Both of these classes of compounds contain aliphatic carbon chains generally having from about 8 to about 24 carbon atoms. The aliphatic carbon chains in the glycerides or FFAs can be fully saturated, or mono-, di- or poly-unsaturated.

There are reports disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises two or more steps to hydrogenate, deoxygenate, isomerize and selectively crack a renewable feedstock, in order to generate a fuel such as aviation fuel. Simply deoxygenating the renewable feedstock typically results in strait chain paraffins having chain-lengths similar to, or slightly shorter than, the fatty acid composition of the feedstock. With many feedstocks, this approach results in a fuel meeting the general specification for a diesel fuel, but not for an aviation fuel. The selective cracking step reduces the chain length of some paraffins to maximize the selectivity to aviation fuel range paraffins while minimizing light products. The selective cracking may occur before, after, or concurrent with the isomerization. An optional reforming step may be included to generate the hydrogen needed in the deoxygenation and the isomerization steps. In one embodiment, a recycle from the effluent of the deoxygenation reaction zone back to the deoxygenation zone is employed. The volume ratio of recycle hydrocarbon to feedstock ranges from about 2:1 to about 8:1 and provides a mechanism to increase the hydrogen solubility and more uniformly distribute the heat of reaction in the deoxygenation reaction mixture. As a result of the recycle, some embodiments may have a lower operating pressure.

SUMMARY OF THE INVENTION

The process is for producing a hydrocarbon fraction useful as fuel or a fuel blending component from a renewable feedstock and the process comprises treating the renewable feedstock in a reaction zone by hydrogenating and deoxygenating the feedstock at reaction conditions to provide a reaction product comprising mostly n-paraffins, isomerizing the n-paraffins to improve cold-flow properties, and selectively cracking the paraffins to provide paraffins useful as fuel or a fuel blending component. The selective cracking may occur before, after, or concurrent with the isomerization. The selective cracking is a process step that preferentially cracks C1-C6 fragments off the end of the long chain n-paraffins to increase the selectivity to the desired carbon number range paraffins significantly in excess of a non-selective statistical cracking process. In one embodiment, a portion of the n-paraffins generated in the deoxygenation step is recycled to the reaction zone with a volume ratio of recycle to feedstock in the range of about 2:1 to about 8:1 in order to increase the solubility of hydrogen in deoxygenation reaction mixture. An optional reforming step may be included in order to produce hydrogen needed in the hydrogenation, deoxygenation, hydroisomerization, and selective hydrocracking steps.

DETAILED DESCRIPTION OF THE INVENTION

As stated, the present invention relates to a process for producing a hydrocarbon stream useful as fuel or a fuel blending component from renewable feedstocks originating from plants or animals other than petroleum derived feedstocks. The term renewable feedstock is meant to include feedstocks other than those obtained directly from petroleum crude oil. Another term that has been used to describe this class of feedstocks is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, and the like. Additional examples of renewable feedstocks include non-edible vegetable oils from the group comprising Jatropha curcas (Ratanjoy, Wild Castor, Jangli Erandi), Madhuca indica (Mohuwa), Pongamia pinnata (Karanji Honge), and Azadiracta indicia (Neem). The glycerides and FFAs of the typical vegetable oil or animal fat or oil contain aliphatic hydrocarbon chains in their structure which have about 8 to about 24 carbon atoms with a majority of the oils containing high concentrations of fatty acids with 16 and 18 carbon atoms. Mixtures or co-feeds of renewable feedstocks and petroleum derived hydrocarbons may also be used as the feedstock. Other non-oxygenated feedstock components which may be used, especially as a co-feed component in combination with the above listed feedstocks, include liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is transformation of what may have been considered to be a waste product from a petroleum based process into a valuable co-feed component to the current process.

The fuel composition generated in the present invention is suitable for, or as a blending component for, uses such as an aviation fuel. Depending upon the application, various additives may be combined with the fuel composition generated in order to meet required specifications for different specific fuels. In particular, the fuel composition generated herein complies with, is a blending component for, or may be combined with one or more additives to meet at least one of: ASTM D 1655 Specification for Aviation Turbine Fuels Defense Stan 91—91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8 which is a military grade type of highly refined kerosene based jet propellant specified by the United States Government. The fuel is defined by Military Specification MIL-DTL-83133. The jet fuel product is very similar to isoparaffinic kerosene or iPK, also known as a synthetic jet fuel.

Renewable feedstocks that can be used in the present invention may contain a variety of impurities. For example, tall oil is a by product of the wood processing industry and tall oil contains esters and rosin acids in addition to FFAs. Rosin acids are cyclic carboxylic acids. The bio-renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. Another technique involves contacting the renewable feedstock with a bleaching earth, such as bentonite clay, in a pretreatment zone.

Another possible means for removing contaminants is a mild acid wash. This is carried out by contacting the feedstock with an aqueous solution mixed with an acid such as sulfuric, nitric, phosphoric, or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826, hereby incorporated by reference, is another pretreatment technique which may be employed.

The renewable feedstock is flowed to a reaction zone comprising one or more catalyst beds in one or more reactors. The term feedstock is meant to include feedstocks that have not been treated to remove contaminants as well as those feedstocks purified in a pretreatment zone. In the reaction zone, the renewable feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. or to about 450° C. and a pressure of about 1379 kPa absolute (200 psia) to about 10,342 kPa absolute (1500 psia), or to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Decarboxylation and decarbonylation conditions pressures including a relatively low pressure of about 1724 kPa absolute (250 psia) to about 10,342 kPa absolute (1500 psia), with embodiments in the range of 3447 kPa (500 psia) to about 6895 kPa (1000 psia) or below 700 psia; a temperature of about 200° C. to about 460° C. with embodiments in the range of about 288° C. to about 345° C.; and a liquid hourly space velocity of about 0.25 to about 4 $hr^{-1}$ with embodiments in the range of about 1 to about 4 $hr^{-1}$. Since hydrogenation is an exothermic reaction, as the feedstock flows through the catalyst bed the temperature increases and decarboxylation, decarbonylation, and hydrodeoxygenation will begin to occur. Although the hydrogenation reaction is exothermic, some feedstocks may be highly saturated and not generate enough heat internally. Therefore, some embodiments may require external heat input. Thus, it is envisioned and is within the scope of this invention that all the reactions occur simultaneously in one reactor or in one bed. Alternatively, the conditions can be controlled such that hydrogenation primarily occurs in one bed and decarboxylation, decarbonylation, and/or hydrodeoxygenation occurs in a second or additional bed(s). If only one bed is used, it may be operated so that hydrogenation occurs primarily at the front of the bed, while decarboxylation, decarbonylation and hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor. However, the order of the reactions is not critical to the success of the process.

Hydrogen is a reactant in the reactions above, and to be effective, a sufficient quantity of hydrogen must be in solution to most effectively take part in the catalytic reaction. If hydrogen is not available at the reaction site of the catalyst, the coke forms on the catalyst and deactivates the catalyst. To solve this kind of problem, the pressure in a reaction zone is often raised to insure enough hydrogen is available to avoid coking reactions on the catalyst. However, higher pressure operations are more costly to build and to operate as compared to their lower pressure counterparts. An advantage of one embodiment of the present invention is that the operating pressure is in the range of about 1379 kPa absolute (200 psia) to about 4826 kPa absolute (700 psia) which is lower than traditionally used in a deoxygenation zone. In another embodiment, the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, with the increase hydrogen in solution, the rate of reaction is increased resulting in a greater amount of throughput of material through the reactor in a given period of time. The lower operating pressures of this embodiment provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In one embodiment of the invention the desired amount of hydrogen is kept in solution at lower pressures by employing a large recycle of hydrocarbon. Other exothermic processes have employed hydrocarbon recycle in order to control the temperature in the reaction zones. However, the range of recycle to feedstock ratios that may be used herein is set based on the need to control the level of hydrogen in the liquid phase and therefore reduce the deactivation rate. The amount of recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1. The ranges of suitable volume ratios of hydrocarbon recycle to feedstock are described in pending application U.S. 60/973,797, hereby incorporated by reference. Suitable ranges for hydrogen solubility were shown to begin at about a recycle to feed ratio of about 2:1. From recycle to feed ratios of about 2:1 through 6:1 the simulation of U.S. 60/973,797 showed that the hydrogen solubility remained high. Thus, the specific ranges of vol/vol ratios of recycle to feed for this embodiment is determined based on achieving a suitable hydrogen solubility in the deoxygenation reaction zone.

In another embodiment, instead of recycling hydrocarbon, one or more of the co-feed components discussed above may be used to provide the solubility of hydrogen and temperature control. Depending upon the relative costs of the hydrocarbon and the co-feed component, one embodiment may be more economic than the other. It is important to note that the recycle or co-feed is optional and the process does not require recycle or co-feed. Complete deoxygenation and hydrogenation may be achieved without recycle or co-feed components. In still another embodiment, the process may be conducted with continuous catalyst regeneration in order to counteract the catalyst deactivation effects of the lower amounts of hydrogen in solution or the higher operating conditions.

The reaction product from the deoxygenation reactions in the deoxygenation zone will comprise a liquid portion and a gaseous portion. The liquid portion comprises a hydrocarbon fraction comprising n-paraffins and having a large concentration of paraffins in the 15 to 18 carbon number range. Different feedstocks will have different distributions of paraffins. A portion of this hydrocarbon fraction, after separation from the gaseous portion, may be used as the hydrocarbon recycle described above. Although this hydrocarbon fraction is useful as a diesel fuel or diesel fuel blending component, additional fuels, such as aviation fuels or aviation fuel blending components which typically have a concentration of paraffins in the range of about 9 to about 15 carbon atoms, may be produced with additional processing. Also, because the hydrocarbon fraction comprises essentially all n-paraffins, it will have poor cold flow properties. Aviation fuel and blending components must have better cold flow properties and so the reaction product is further reacted under isomerization conditions to isomerize at least a portion of the n-paraffins to branched paraffins.

Catalysts and conditions for isomerization are well known in the art. See for example US 2004/0230085 A1 which is incorporated by reference in its entirety. The same catalyst may be employed for both the isomerization and the selective cracking, or two or more different catalysts may be employed. Isomerization can be carried out in a separate bed of the same reaction zone, i.e. same reactor, described above or the isomerization can be carried out in a separate reactor. Therefore, the product of the deoxygenation reaction zone is contacted with an isomerization catalyst in the presence of hydrogen at isomerization conditions to isomerize at least a portion of the normal paraffins to branched paraffins. The isomerization catalyst may be the same catalyst as the selective cracking catalyst, or it may be a different catalyst. Due to the presence of hydrogen, this reaction may also be called hydroisomerization. Only minimal branching is required, enough to overcome cold-flow problems of the normal paraffins.

Overall, the isomerization of the paraffinic product can be accomplished in any manner known in the art or by using any suitable catalyst known in the art. Many of the isomerization catalysts are also suitable selective cracking catalysts, although some may require different conditions than would be employed for isomerization alone. Catalysts having small or medium sized pores, which are therefore shape selective, are favorable for catalyzing both the isomerization reaction and the selective cracking. In general, suitable isomerization catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodyrnium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,134 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,968,344 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

Isomerization zone conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia).

The product of the hydrogenation, deoxygenation, and isomerization steps contains paraffinic hydrocarbons suitable for use as diesel fuel or as a blending component for diesel fuel, but further processing results in paraffinic hydrocarbons meeting the specifications for other fuels or as blending components for other fuels. As illustrative of this concept, a concentration of paraffins formed from renewable feedstocks typically have about 15 to 18 carbon atoms, but additional paraffins may be formed to provide a range of from about 8 to about 24 carbon atoms. A portion of the normal paraffins are isomerized to branched paraffins, but the carbon number range of paraffins does not alter with only isomerization. The about 9 to about 24 carbon number range is a desired paraffin carbon number range for diesel fuel, which is a valuable fuel itself. Aviation fuel, however, generally comprises paraffins having boiling points from 150° C. to about 300° C. which is lower than that of diesel fuel. To convert the diesel range fuel to a fuel useful for aviation, the larger chain-length paraffins are cracked. Typical cracking processes are likely to crack the paraffins too much and generate a large quantity of undesired low molecular weight molecules which have much lower economic value. In the present invention, the paraffins generated from the renewable feedstock are selectively cracked in order to control the degree of cracking and maximize the amount of product formed in the desired carbon number range. The selective cracking is controlled through catalyst choice and reaction conditions in an attempt to restrict the degree of cracking occurring. Ideally, each paraffin molecule would experience only a single cracking event and ideally that single cracking event would result in at least one paraffin in the C9 to C15 carbon number range.

However, fuel specifications are typically not based upon carbon number ranges. Instead, the specifications for different types of fuels are often expressed through acceptable ranges of chemical and physical requirements of the fuel. For example, aviation turbine fuels, a kerosene type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of the present invention may meet fuel specifications, it is expected that some blending of the product with other blending components may be required to meet the desired set of fuel specifications. In other words, the product of this invention is a composition which may be used with other components to form a fuel meeting at least one of the specifications for aviation fuel such as JP-8.

The desired product is a highly paraffinic distillate fuel component having a paraffin content of at least 75% by volume.

The selective cracking step and the isomerization step may be either co-current or sequential. The cracking may be conducted first to minimize the over-cracking of the highly branched hydrocarbons resulting from the isomerization. The selective cracking may proceed through several different routes. The catalysts for the selective cracking process typically comprise at least a cracking component and a non cracking component. Compositing the catalyst with active and non active cracking components may positively affect the particle strength, cost, porosity, and performance. The non cracking components are usually referred to as the support. However, some traditional support materials such as silica-alumina may make some contribution to the cracking capability of the catalyst. One example of a suitable catalyst is a composite of zeolite beta and alumina or silica alumina. Other inorganic refractory materials which may be used as a support in addition to silica-alumina and alumina include for example silica, zirconia, titania, boria, and zirconia-alumina. These support materials may be used alone or in any combination. Another example is a catalyst based on zeolite Y, or one having primarily amorphous cracking components.

The catalyst of the subject process can be formulated using industry standard techniques. It is may be manufactured in the form of a cylindrical extrudate having a diameter of from about 0.8 to about 3.2 mm (1/32 in to about 1/8 in). The catalyst can be made in any other desired form such as a sphere or pellet. The extrudate may be in forms other than a cylinder such as the form of a well-known trilobe or other shape which has advantages in terms or reduced diffusional distance or pressure drop.

A non-selective catalyst may be utilized under conditions optimized to result in selective cracking, where primary cracking is accomplished with minimal secondary cracking. Furthermore, a non-selective catalyst may be modified to weaken the acidity of the catalyst in order to minimize undesired cracking.

One class of suitable selective cracking catalysts are the shape-selective catalysts. Highly isomerized paraffins are more readily cracked as compared to straight chain or monosubstituted paraffins since they can crack through stabilized carbenium-ion intermediates. Unfortunately, this leads to the tendency for these molecules to over crack and form lighter molecules outside the preferred aviation fuel range. Highly isomerized paraffins are also more likely to crack than the other paraffins and can be prevented from entering the pore structures of some molecular sieves. A shape-selective catalyst would prevent the majority of highly isomerized molecules from entering the pore structure and cracking leaving only straight-chain or slightly isomerized paraffins to crack in the catalyst pores. Furthermore, by selective small to medium size pore molecular sieves, the smaller pore size will prevent easy diffusion of the long chain paraffin deep into the pore system. The end of a long chain paraffin enters the pore channel of the catalyst and encounters a dehydrogenation active site, such as platinum, resulting in an olefin. Protonation of the olefins yields a carbenium ion which rearranges by methyl shift to form a carbenium ion with a single methyl branch, then via β-elimination, the hydrocarbon cracks at the site of the methyl branch yielding two olefins, one short chain and one long chain. In this way, beta scission cracking, the primary mechanism for bronsted acids, will therefore occur close to the pore mouth of the catalyst. Since diffusion is limited, cracking will be primarily at the ends of the paraffins. Examples of suitable catalysts for this route include ZSM-5, ZSM-23, ZSM-11, ZSM-22 and ferrierite. Further suitable catalysts are described in Arroyo, J. A. M.; Martens, G. G.; Froment, G. F.; Marin, G. B.; Jacobs, P. A.; martens, J. A., Applied Catalysis, A: General, 2000, 192(1)9-22; Souverijins, W.; martins, J. A.; Froment, G. F.; Jacobs, P. A., Journal of Catalysis, 1998, 174(2)177-184; Huang, W.; Li, D.; Kang, X; Shi, Y.; Nie, H. Studies in Surface Science and Catalysis, 2004, 154(c) 2353-2358; Claude, M. C.; Martens J. A. Journal of Catalysis, 2000, 190(1), 39-48; Sastre, G.; Chica, A.; Corma, A., Journal of Catalysis, 2000, 195(2), 227-236.

In one embodiment, the selective cracking catalyst also contains a metallic hydrogenolysis component. The hydrogenolysis component is provided as one or more base metals uniformly distributed in the catalyst particle. Noble metals such as platinum and palladium could be applied, or the composition of the metal hydrogenolysis component may be, for example, nickel, iridium, rhenium, rhodium, or mixtures thereof. The hydrogenolysis function preferentially cleaves C1 to C6 fragments from the end of the paraffin molecule. Two classes of catalysts are suitable for this approach. A first class is a catalyst having a hydrogenolysis metal with a mechanistic preference to crack the ends of the paraffin molecules. See, for example, Carter, J. L.; Cusumano, J. A.; Sinfelt, J. H. Journal of Catalysis, 20, 223-229 (1971) and Huang, Y. J.; Fung, S. C.; Gates, W. E.; McVicker, G. B. journal of Catalysis 118, 192-202 (1989). The second class of catalysts include those where the hydrogenolysis function is located in the pore moth of a small to medium pore molecular sieve that prevent facile diffusion of the ling chain paraffin molecule into the pores system. Also, since olefins are easy to protonate, and therefore crack, as compared to paraffins, the dehydrogenation function component may be minimized on the external surface of the catalyst to maintain the selectivity of the cracking. Examples of suitable catalysts for this hydrogenolysis route of selective cracking include silicalite, ferrierite, ZSM-22, ZSM-23 and small to medium pore molecular sieves.

Another suitable type of catalysts include molecular sieves with strong pore acidity, which when used a higher operating temperatures promote Haag Dessau cracking; a type of acid-catalyst cracking that does not require isomerization or a bifunctional catalyst as described in Weitkamp et al. Agnew. Chem. Int. ed. 2001, 40, No. 7, 1244. The intermediate is a carbonium ion formed after prontonation of a carbon-carbon or carbon-hydrogen bond. The catalyst does not need a significant dehydrogenation function since the olefin is not necessary. Residence time on these strong acid sites would need to be minimized to prevent extensive cracking by techniques such as reducing the acid site density or operating at a higher space velocity. An example of a suitable catalyst for this approach is ZSM-5.

The selective cracking is operated at a range of conditions that provide product in the targeted carbon number range. Therefore, the operating conditions in many instances are refinery or processing unit specific. They may be dictated in large part by the construction and limitations of the existing selective cracking unit, which normally cannot be changed without significant expense, the composition of the feed and the desired products. The inlet temperature of the catalyst bed should be in the range of from about 232° C. to about 454° C. (about 450° F. to about 850° F.), and the inlet pressure should be above about 1379 kPa gauge to about 13,790 kPa gauge (200 to about 2,000 psig). The feed stream is admixed with sufficient hydrogen to provide hydrogen circulation rate of about 168 to 1684 n·l/l (1000 to 10000 SCF/barrel, hereafter SCFB) and passed into one or more reactors containing fixed beds of the catalyst. The hydrogen will be primarily derived from a recycle gas stream which may pass through purification facilities for the removal of acid gases. The hydrogen rich gas admixed with the feed and in one embodiment any recycle hydrocarbons will contain at least 90 mol percent hydrogen. The feed rate in terms of liquid hourly space velocity (L.H.S.V.) will normally be within the broad range of about 0.3 to about 5 hr$^{-1}$, with a L.H.S.V. below 1.2 being used in one embodiment.

The two reactions types, isomerization and selective cracking may be carried out together using the same catalyst, or separately using the same or different catalysts. In the situation where the isomerization and selective cracking catalysts are the same, the acidity of the catalyst is selected to be great enough to perform both the isomerization and the selective cracking. In this embodiment, both isomerization and selective cracking occur concurrently. Examples of catalysts suitable for both reaction types include, but are not limited to, zeolite Y, amorphous silica alumina, MOR, SAPO-11 and SM3. An example of combined isomerization and selective cracking conditions include a temperature of about 150° C. to about 360° C. or about 150° C. to about 375° C. and a pressure of about 1724 kPa absolute (250 psia) to about 4726 kPa absolute (700 psia). In another embodiment the combined isomerization and selective cracking conditions include a temperature of about 300° C. to about 360° C. and a pressure of about 3102 kPa absolute (450 psia) to about 3792 kPa absolute (550 psia).

On the other hand, when the isomerization and selective cracking are conducted in separate reaction zones, the catalysts for the two reaction types need not be the same. Any of the above catalysts may be employed. The selective cracking may be done before or after the isomerization step. Specific examples of isomerization catalysts include those having moderate acidity, enough for isomerization but weak enough to prevent significant cracking, include platinum modified MAPSO-31, platinum modified MAPSO-SM3, platinum modified SAPO-11, and platinum modified and acid washed UZM-15. The prevention of significant cracking is important since the desired product range is C9 to C15 and significant uncontrolled cracking may result in a large amount of C8 and lower carbon atoms paraffins being produced. The selective cracking catalyst may have a higher acidity than the isomerization catalyst, and specific examples include ZSM-5, Y zeolite, and MOR.

Optionally, the process may employ a steam reforming zone in order to provide hydrogen to the hydrogenation/deoxygenation zone, isomerization zone, and/or selective cracking zone. The steam reforming process is a well known chemical process for producing hydrogen, and is the most common method of producing hydrogen or hydrogen and carbon oxide mixtures. A hydrocarbon and steam mixture is catalytically reacted at high temperature to form hydrogen, and the carbon oxides: carbon monoxide and carbon dioxide. Since the reforming reaction is strongly endothermic, heat must be supplied to the reactant mixture, such as by heating the tubes in a furnace or reformer. A specific type of steam reforming is autothermal reforming, also called catalytic partial oxidation. This process differs from catalytic steam reforming in that the heat is supplied by the partial internal combustion of the feedstock with oxygen or air, and not supplied from an external source. In general, the amount of reforming achieved depends on the temperature of the gas leaving the catalyst; exit temperatures in the range of about 700° C. to about 950° C. are typical for conventional hydrocarbon reforming. Pressures may range up to about 4000 kPa absolute. Steam reforming catalysts are well known and conventional catalysts are suitable for use in the present invention.

Typically, natural gas is the most predominate feedstock to a steam reforming process. However, in the present invention, hydrocarbons that are too light for the desired product may be generated at any of the reaction zones. For example, in the deoxygenation zone, propane is a common by product. Other C1 to C3 paraffins may be present as well. These lighter components may be separated from the desired portion of the deoxygenation effluent and routed to the steam reforming zone for the generation of hydrogen. Similarly, paraffins having eight or less carbon atoms from the effluent of the collective isomerization and selective cracking steps may be conducted to the reforming zone. Therefore, the lighter materials from the deoxygenation, isomerization and cracking zones are directed, along with stream, to a reforming zone. In the reforming zone, the lighter hydrocarbons and steam are catalytically reacted to form hydrogen and carbon oxides. The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to any of the reaction zones. Since hydrogen is an expensive resource, generating at least a portion of the required hydrogen from the undesired products of the reaction zones can decrease the cost of the process. This feature becomes more valuable when an external source of hydrogen is not readily available.

In an alternative embodiment, catalytic reforming may be employed instead of steam reforming. In a typical catalytic reforming zone, the reactions include dehydrogenation, isomerization and hydrocracking. The dehydrogenation reactions typically will be the dehydroisomerization of alkylcyclopentanes to aromatics, the dehydrogenation of paraffins to olefins, the dehydrogenation of cyclohexanes to aromatics and the dehydrocyclization of acyclic paraffins and acyclic olefins to aromatics. The isomerization reactions included isomerization of n-paraffins to isoparaffins, the hydroisomerization of olefins to isoparaffins, and the isomerization of substituted aromatics. The hydrocracking reactions include the hydrocracking of paraffins. The aromatization of the n-paraffins to aromatics is generally considered to be highly desirable because of the high octane rating of the resulting aromatic product. In this application, the hydrogen generated by the reactions is also a highly desired product, for it is recycled to at least the deoxygenation zone. The hydrogen generated is recycled to any of the reaction zones, the hydrogenation/deoxygenation zone, the isomerization zone, and or the selective cracking zone.

Figure 1:
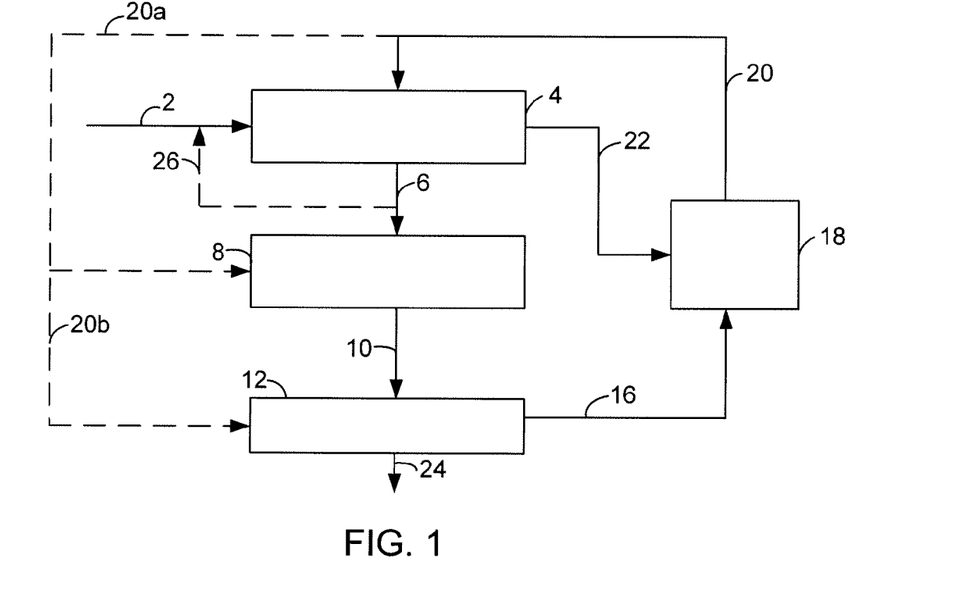
FIG. 1 is a general flow scheme diagram of the invention where isomerization occurs before selective cracking.
Figure 2:
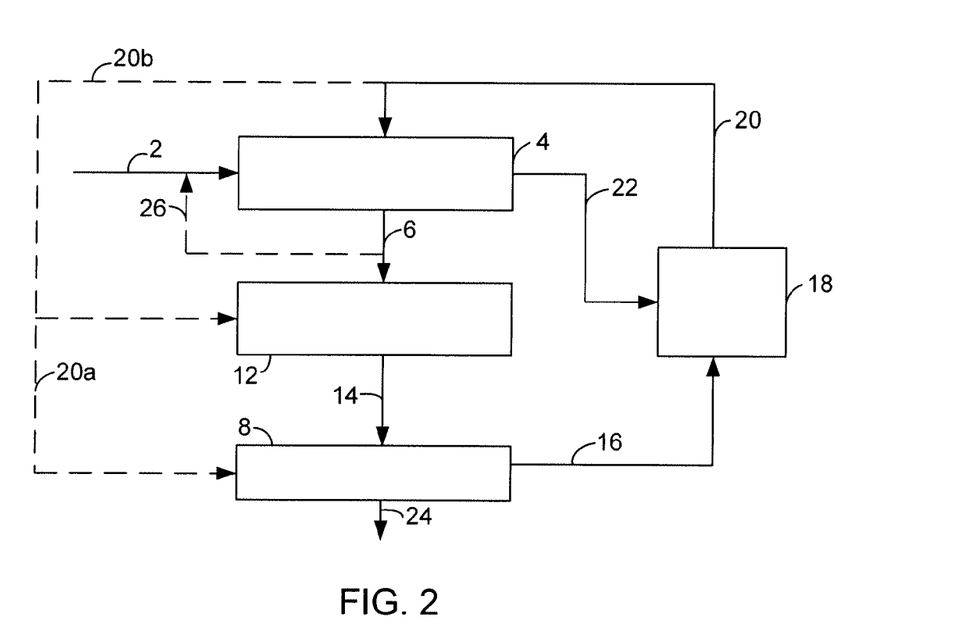
FIG. 2 is a general flow scheme diagram of the invention where selective cracking occurs before the isomerization.
Figure 3:
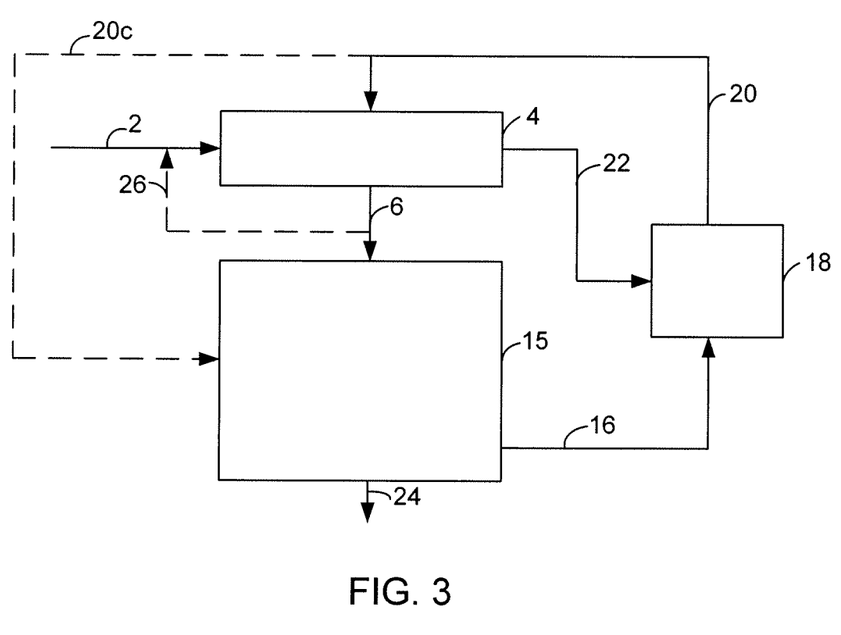
FIG. 3 is a general flow scheme diagram of the invention where isomerization occurs concurrently with the selective cracking.

Three general flow schemes are shown in the figures. FIG. 1 shows the sequence of reaction zones as a deoxygenation zone followed by an isomerization zone followed by a selective cracking zone. In FIG. 2, the order of the isomerization zone and selective cracking zone is reversed as compared to FIG. 1. In FIG. 3, the isomerization zone and the selective cracking zone are combined into a single combined zone.

In FIG. 1, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). C3 and lighter components may be separated and removed in line 22 and conducted to reforming zone 18. Optionally, line 22 may contain the C3 and light components as well as the carbon oxides, possibly hydrogen sulfide, and water vapor, thus eliminating a separation. The deoxygenated liquid product is passed to the isomerization reaction zone 8 for conversion of normal paraffins to branched paraffins. Branched paraffin effluent 10 of isomerization zone 8 is passed to selective cracking zone 12 to crack the higher carbon number paraffins and form paraffins in the desired aviation fuel range. After selective cracking the desired aviation fuel range of paraffin-rich product is collected via line 24 and the C8 and lighter components are separated and recycled via line 16 to reforming zone 18. Hydrogen generated in reforming zone 18 is recycled via line 20 to the deoxygenation zone 4. Optionally, hydrogen generated in reforming zone 18 is recycled via line 20a to the isomerization zone 8, and or via line 20b to the selective cracking zone 12. Other components may be removed from reforming zone 18 (not shown).

In FIG. 2, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). C3 and lighter components may be separated and removed in line 22 and conducted to reforming zone 18. Optionally, line 22 may contain the C3 and light components as well as the carbon oxides, possibly hydrogen sulfide, and water vapor, thus eliminating a separation. The deoxygenated liquid product is passed to selective cracking zone 12 to crack the higher carbon number paraffins and form paraffins in the desired aviation fuel range. Effluent of the selective cracking zone 12 is passed to the isomerization reaction zone 8 for conversion of normal paraffins to branched paraffins. After isomerization in isomerization zone 8 the desired aviation fuel range of paraffin-rich product is collected via line 24 and the C8 and lighter components are separated and recycled via line 16 to reforming zone 18. Optionally, the liquid portion of the recycle in line 16 may be separated and sold as a product, added to a gasoline pool, or upgraded by other refinery processes (not shown). Hydrogen generated in reforming zone 18 is recycled via line 20 to the deoxygenation zone 4. Optionally, hydrogen generated in reforming zone 18 is recycled via line 20a to the isomerization zone 8, and or via line 20b to the selective cracking zone 12. Other components may be removed from reforming zone 18 (not shown).

In FIG. 3, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). C3 and lighter components may be separated and removed in line 22 and conducted to reforming zone 18. Optionally, line 22 may contain the C3 and light components as well as the carbon oxides, possibly hydrogen sulfide, and water vapor, thus eliminating a separation. The deoxygenated liquid product is passed to the combined isomerization and selective cracking zone 15 for both conversion of normal paraffins to branched paraffins and selective cracking of the higher carbon number paraffins to form paraffins in the desired aviation fuel range. After isomerization and selective cracking the desired aviation fuel range of paraffin-rich product is collected via line 24 and the C8 and lighter components are separated and recycled via line 16 to reforming zone 18. Hydrogen generated in reforming zone 18 is recycled via line 20 to the deoxygenation zone 4. Other components may be removed from reforming zone 18 (not shown).

The final effluent stream, i.e. the stream obtained after all reactions have been carried out, may be processed through one or more separation steps to obtain a purified hydrocarbon stream useful as an aviation fuel. Because the final effluent stream comprises both a liquid and a gaseous component, the liquid and gaseous components are separated using a separator. The separated liquid component comprises the product hydrocarbon stream useful as an aviation fuel. Further separations may be performed to remove naphtha and LPG from the product hydrocarbon stream. The separated gaseous component comprises mostly hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending application U.S. Ser. No. 12/193,176 and U.S. Ser. No. 12/193,196, hereby incorporated by reference, may be employed. If desired, essentially pure carbon dioxide can be recovered by regenerating the spent absorption media. The hydrogen remaining after the removal of the carbon dioxide may be recycled to the reaction zone where hydrogenation primarily occurs and/or to any subsequent beds/reactors.

Finally, a portion of the product hydrocarbon is recycled to the hydrogenating and deoxygenating reaction zone. The recycle stream may be taken from the product hydrocarbon stream after the hydrogenating and deoxygenating reactor(s) and separation from gaseous components, and recycled back to the hydrogenating and deoxygenating reactor(s). A portion of a hydrocarbon stream may also be cooled down if necessary and used as cool quench liquid between the beds of the deoxygenation reaction zone to further control the heat of reaction and provide quench liquid for emergencies. The recycle stream may be introduced to the inlet of the deoxygenation reaction zone and/or to any subsequent beds or reactors. One benefit of the hydrocarbon recycle is to control the temperature rise across the individual beds. However, as discussed above, the amount of hydrocarbon recycle herein is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The following example is presented in illustration of this invention and is not intended as an undue limitation on the generally broad scope of the invention as set out in the appended claims.

EXAMPLE

Deoxygenation of refined-bleached-deodorized (RBD) soybean oil over the deoxygenation catalyst CAT-DO was accomplished by mixing the RBD soybean oil with a 2500 ppm S co-feed and flowing the mixture down over the catalyst in a tubular furnace at 330° C., 3447 kPa gauge (500 psig), LHSV of 1 $h^{-1}$ and an $H_2$/feed ratio of 4000 scf/bbl. The soybean oil was completely deoxygenated and the double bonds hydrogenated to produce an n-paraffin mixture having predominantly from about 15 to about 18 carbon atoms; deoxygenation products CO, $CO_2$, $H_2O$, and propane; with removal of the sulfur as $H_2S$.

The n-paraffin product from the deoxygenation stage was fed over a cracking catalyst CAT-C1 in a second process step. The n-paraffin mixture having predominantly from about 15 to about 18 carbon atoms was delivered down flow over the cracking catalyst in a tubular furnace at 280° C., 3447 kPa gauge (500 psig), 0.8 LHSV and an H$_2$/feed ratio of 2500 scf/bbl. This step produced 50% jet fuel-range paraffins but the product was not highly isomerized to meet the required freeze point properties. Therefore, the product of this stage was fed over isomerization catalyst CAT-Iso in a similar tubular furnace at 330° C., 3447 kPa gauge (500 psig), 1 LHSV, and an H2/feed ratio of 2500 scf/bbl. The product from this isomerization step was fractionated and the jet fuel range material (as defined in the specification for JP-8, MIL-DTL-83133) was collected. The final yield of jet fuel (normal and isoparaffins) was 36 wt-% of vegetable oil feed. The properties of final jet fuel produced are shown in the Table.

TABLE

| Sample: | % aromatic added | Freeze Point, ° C. | Flash Point, ° C. | Density, g/cc |
|---|---|---|---|---|
| JP-8 Specifications | | −47 | 38 | 0.775 |
| Soybean oil paraffin | 0% | −52.6 | 53 | 0.759 |

In a second iteration of the experiment, the RBD soybean oil feed was again deoxygenated over CAT-DO using the same conditions as above. The deoxygenated paraffin product was then processed over CAT-C2 at 345C, 3447 kPa gauge (500 psig), 1 LHSV, and an H2/feed ratio of 2500 scf/bbl. However, this catalyst contained a selective cracking function that also produced a much higher iso/normal ratio paraffin product. Therefore, a separate isomerization processing step (the third step of the first example) was not required. After fractionation the jet fuel yield was 40 wt-% of the vegetable oil feed. The properties of this product also met the freeze and flash point requirements for JP-8 as defined by MIL-DTL-83133.

The invention claimed is:

1. A process for producing a hydrocarbon product from a renewable feedstock comprising:
   a) hydrogenating and deoxygenating the renewable feedstock by contacting the feedstock with a hydrogenation and deoxygenation catalyst at hydrogenation and deoxygenation conditions to provide n-paraffins;
   b) isomerizing at least a portion of the n-paraffins by contacting with an isomerization catalyst at isomerization conditions to generate branched-paraffins;
   c) selectively cracking at least a portion of the n-paraffins, the branched-paraffins, or a mixture thereof by contacting with a selective cracking catalyst at selective cracking conditions to generate cracked paraffins wherein each cracked paraffin has at least carbon one less carbon atom after the selective cracking as compared to before the selective cracking; and recovering the hydrocarbon product comprising at least 30 mole-% hydrocarbons having from about 9 to about 15 carbon atoms; and
   d) recycling a portion of n-paraffins to the hydrogenating and deoxygenating step wherein the volume ratio of recycle to feedstock is in the range of about 2:1 to about 8:1.

2. The process of claim 1 wherein the n-paraffins have from about 6 to about 24 carbon atoms.

3. The process of claim 1 wherein the selective cracking is performed before, after, or concurrent with the isomerization.

4. The process of claim 1 wherein the isomerization catalyst and the selective cracking catalyst are the same and the isomerization and selective cracking office concurrently in the same reaction zone.

5. The process of claim 1 where the hydrogenation and deoxygenation conditions include a temperature of about 200° C. to about 300° C. and a pressure of about 1379 kPa absolute (200 psia) to about 4826 kPa absolute (700 psia).

6. The process of claim 1 where deoxygenation comprises at least one of decarboxylation, decarbonylation, and hydro-deoxygenation.

7. The process of claim 1 wherein the renewable feedstock is in a mixture or co-feed with a petroleum hydrocarbon feedstock, and the petroleum hydrocarbon feedstock is co-processed with the renewable feedstock.

8. The process of claim 1 wherein the renewable feedstock comprises at least one component selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm oil, kernel oil ratanjoy oil, wild castor oil, jangli oil erandi oil, mohuwa oil, karanji honge oil, neem oil, and mixtures thereof.

9. The process of claim 1 further comprising co-feeding or mixing with the renewable feedstock, a component selected from the group consisting of liquids derived from gasification of coal, biomass, or natural gas followed by a downstream liquefaction; liquids derived from depolymerization, thermal or chemical, of waste plastics; and synthetic oils generated as byproducts from petrochemical and chemical processes.

10. The process of claim 1 wherein the dehydrogenation and deoxygenation conditions pressures include a pressure of about 1724 kPa absolute (250 psia) to about 10,342 kPa absolute (1500 psia) and a temperature in the range of about 200° C. to about 460° C.

11. The process of claim 1 where the isomerization conditions include a temperature of about 150° C. to about 375° C. and a pressure of about 1724 kPa absolute (250 psia) to about 4726 kPa absolute (700 psia).

12. The process of claim 1 where the selective cracking conditions include an inlet temperature of the catalyst bed in the range of from about 232° C. to about 454° C., and the inlet pressure in the range of about 1379 kPa gauge (200 psig) to about 13,790 kPa gauge (2,000 psig).

13. The process of claim 1 wherein the dehydrogenating and deoxygenating further generate at least propane which is separated from the n-paraffins and conducted to a steam reforming zone to produce at least hydrogen, and said hydrogen being recycled to at least the dehydrogenating and deoxygenating step.

14. The process of claim 1 wherein the selective cracking further provides hydrocarbons having 8 or less carbon atoms which are separated from hydrocarbons having 9 or more carbon atoms, the hydrocarbons having 8 or less carbon atoms being conducted to a steam reforming zone to produce at least hydrogen, said hydrogen being recycled to at least the dehydrogenating and deoxygenating step.

15. The process of claim 14 wherein the hydrocarbons having 8 or less carbon atoms are separated into a light stream comprising hydrocarbons having 5 or fewer carbon atoms from a liquid stream having 6 or greater carbon atoms, with the light stream being conducted to the steam reforming zone.

16. The process of claim 15 wherein the liquid steam is collected as product or further refined.

17. The process of claim 1 further comprising mixing one or more additives to the hydrocarbon product.

* * * * *